Jan. 2, 1951 W. F. FLANAGAN 2,536,048
METHOD OF PRODUCING A SMOOTH-WRINKLE PATTERNED FILM
Filed April 12, 1947 2 Sheets—Sheet 2

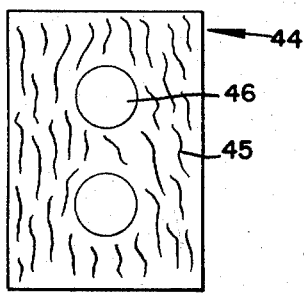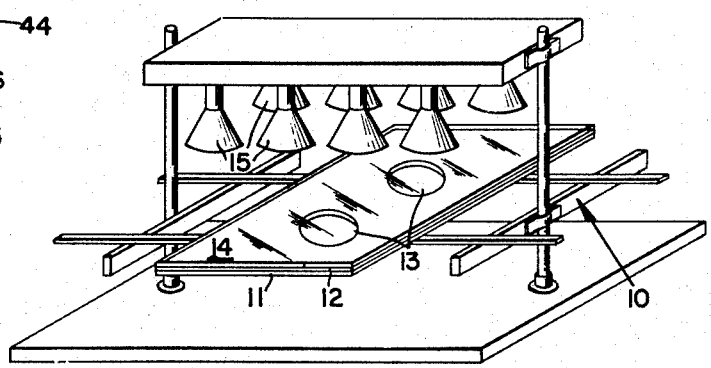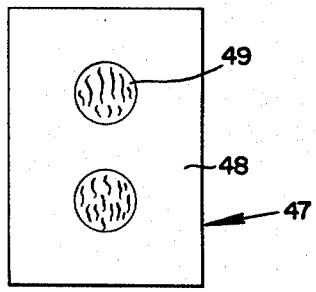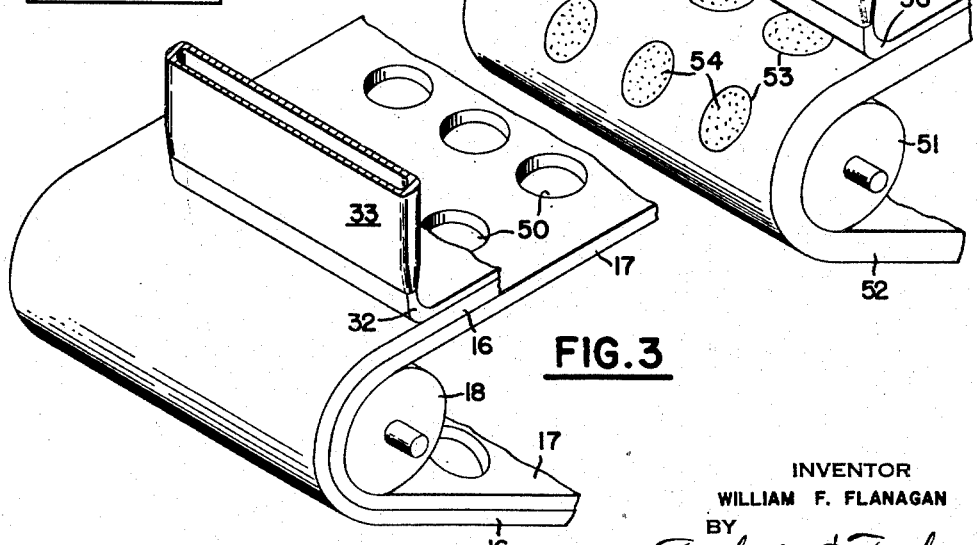

INVENTOR
WILLIAM F. FLANAGAN
BY
Toulmin & Toulmin
ATTORNEYS

Patented Jan. 2, 1951

2,536,048

UNITED STATES PATENT OFFICE 2,536,048

METHOD OF PRODUCING A SMOOTH-WRINKLE PATTERNED FILM

William F. Flanagan, Dayton, Ohio, assignor to New Wrinkle, Inc., Dayton, Ohio, a corporation of Delaware Application April 12, 1947, Serial No. 741,098

11 Claims. (Cl. 18—57)

This invention deals with a plastic material, and in particular with a method of producing plastic film having a pattern formed by a predetermined arrangement of smooth and wrinkle-textured areas.

It is an object of this invention to produce a film having a wrinkle-textured pattern which has an extremely pleasing appearance.

It is another object of this invention to produce a film having a wrinkle-textured pattern and a smooth background for the production of which no separate printing step or the like has to be used.

It is still another object of this invention to produce a film having a pattern formed by wrinkle-textured and non-wrinkled areas for which the use of two different compositions, such as a wrinkling and a non-wrinkling composition, is not required.

It is still another object of this invention to provide a process of making a film having a pattern of wrinkled and smooth areas which requires only one single coating composition.

These and other objects are accomplished by selectively drying a film forming coating whereby the areas to be wrinkled only are brought into a condition which is affectable by water, that means which wrinkle when water is applied to these areas, while the remaining areas will dry to a smooth film even when treated with water.

In my copending application, Serial No. 709,310, filed November 12, 1946, now Patent No. 2,510,966, it is set forth that coatings consisting of plastic material that is non-wrinkling per se, may be converted into a wrinkle-textured film by applying water thereto after skin formation. This process, however, can only take place if the skin is still soft enough to be cooled by the water, because only then are tensions created within the film and wrinkles formed during drying. Thus, there are two stages through which a film goes while being baked in which it is not affectable by water with regard to wrinkle formation, namely the stage prior to the formation of a skin and the stage when a skin has formed, but has become so hard and cool that water does not create any tensions and consequently not any wrinkles. Therefore, by heating predetermined selected areas of a coating or film to a degree when a skin has just formed and then immediately applying water before hardening of said skin, these skin covered areas will wrinkle when in contact with the water whereas the adjacent areas which may be either heated less than is necessary for skin formation or beyond said initial stage of skin formation will not be affected by the water and remain smooth after drying.

The differential heating necessary for materializing the objects of my invention may be carried out in various ways. Broadly, it is accomplished by supporting the coating or film during heating for skin formation on a composition material combined of areas of different specific heats, for instance on a metal plate with good heat conductivity in which areas have been cut out so that at these places the heat conductivity to the film is essentially reduced or on a plate with holes cut out and then filled with a material of different heat conductivity. Whereas in the former case, on account of the holes, a second continuous supporting plate for the film is necessary, such a plate may be dispensed with in the latter case. Thus, a metal plate with holes arranged in the pattern desired may be used as the element for the production of selective heating and a glass plate may be put thereover as the support proper for the film. On the other hand a belt may be used consisting of a stainless steel body in which holes have been provided and filled out with asbestos material; in this case the belt is both support and element for differential heating. Another embodiment for the combination support-differential heating element is a paper which has been printed with metal in the desired pattern, the printed places having a higher heat conductivity than the metal-free areas. It will be understood that various other methods and means may be selected for accomplishing the same result of selective heating.

One embodiment of the method of my invention, as it is preferably carried out, is as follows: A plastic coating composition, in the form of a solution, is spread in a thin film onto a glass plate or onto a plate combined of materials of different heat conductivities as described above. Thereafter the thickness is advantageously adjusted and made uniform by means of a knife, a doctor blade or other like means known in the art. In the case of a glass plate being used, this is then placed onto a metal plate in which the pattern desired has been cut out. The entire assembly is then subjected to infrared heat where the coating is heated until a skin starts to form in the areas which are to be wrinkled in the final film. Thereafter the plate with the film thereon is immediately immersed in water which preferably contains a wetting agent. There, the wrinkle formation proper takes place in the areas on which the skin had just formed previous to immersion.

After a few minutes of immersion, wrinkle formation is completed; the film is then rinsed with water in order to remove the wetting agent from its surface. Thereafter the film is heated for the purpose of eliminating the solvent therefrom. The film is then peeled off the supporting plate preferably by immersing the plate first into a solution of trisodium phosphate. The isolated film is finally allowed to air dry whereupon it is ready for use.

As set forth above, the coating may be exposed to infrared heat either for a time until a skin has just formed on the faster drying areas, or it may be exposed until the areas which are more slowly heated show a skin. In the latter case, the faster heated areas have already experienced a hardening of their skin so that the film will not become affected when immersed in water, while the areas heated more slowly will be wrinkled.

A composition which proved especially satisfactory for the invention, consisted of

|  | Grams |
| --- | --- |
| Vinyl chloride-acetate copolymer | 150 |
| Butyl acetate | 100 |
| Methyl ethyl ketone | 100 |
| Cyclohexanone | 125 |
| Diethylhexyl phthalate | 25 |

The copolymer used in this instance consisted of 87% by weight of vinyl chloride and 13% by weight of vinyl acetate. Diethylhexyl phthalate was used as a plasticizer. The film was supported by a glass plate which again was heated on a metal plate with holes therein in regular intervals; the temperature was maintained at approximately 140° F., measured on the metal plate, for the purpose of producing the skin. The film was exposed to this temperature for a time of about 1½ minutes, in which case the faster drying areas were to be wrinkled. An exposure to approximately 140° F. for 4 minutes, however, caused cooling and hardening of the skin on the faster drying areas and development of a skin on the slower drying areas. The skin-covered film was immersed into water with the wetting agent for approximately 3 minutes; the rinsed film was heated first to 120° F. for about half an hour and then to 220° F. until complete removal of the solvent. The time of immersion into the sodium phosphate solution was approximately 15 minutes. It is obvious that these times and temperatures are greatly dependent upon the thickness of the film, the materials used, distance of the heating source, concentration of the solution and other factors known to those skilled in the art.

In the following drawings, two embodiments of my invention are diagrammatically illustrated; there Figure 1 is a perspective view of one apparatus used for the process of my invention;

Figure 3 is an enlarged perspective view of a part of the apparatus shown in Figure 2;

Figure 4 is a plan view of a film obtained with the process of my invention;

Figure 5 is a plan view of another film obtained with the process of my invention; and Figure 6 is a fragmentary perspective view of a modification of an apparatus for carrying out the process of this invention.

Figure 2:
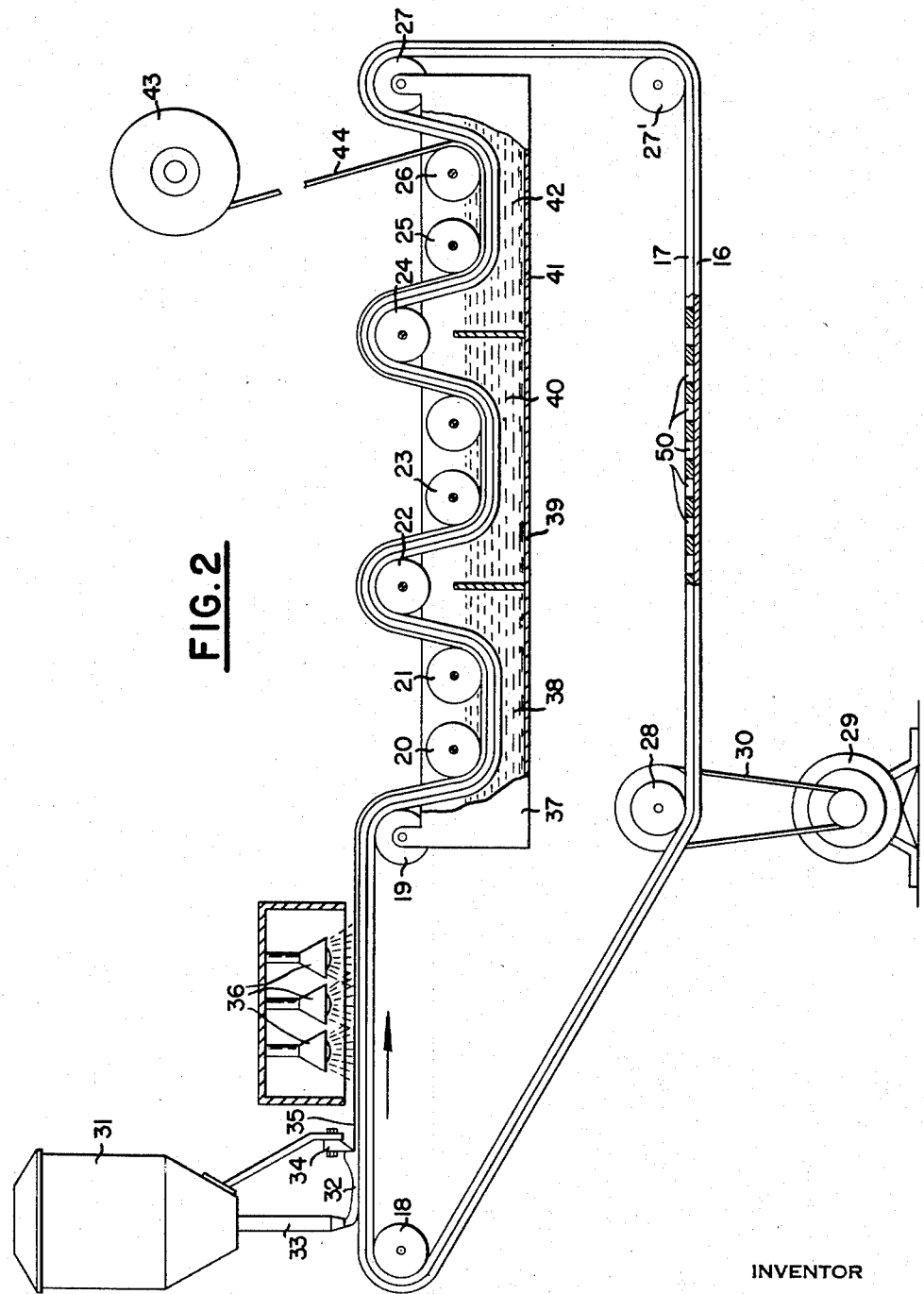
Figure 2 is a side elevational view, partly in section, of an apparatus determined for a continuous operation of my invention.

Referring to the drawings in detail, and in particular to Figure 1, the reference numeral 10 designates a frame on which a support plate of glass is placed. This glass plate rests on a metal plate 11 which functions as the element for the creation of selective heating. Through the glass plate 12 there are visible holes 13 which are arranged in said metal plate. A film 14, in this case of transparent nature, is applied to said glass plate 12, and a series of infrared lamps 15 are mounted over said film 14 in the proper distance therefrom. Since the material of the plate 11 has a heat conductivity which is different from that of air, a different degree of heating is obtained in the film, the areas located over the metal being heated faster than those over the holes. Consequently a skin will form on the background before it forms in the pattern. The film, in this state of a skin having just developed on the background only, is taken off the frame 10 and immersed in water when wrinkles develop only on the areas which had formed a skin. If, however, heating is continued until the skin and the layers underneath said skin have hardened and a skin just forms on the slower heated areas, the opposite result will be obtained, namely the parts which in the former case developed a wrinkled texture will now remain smooth, whereas the slower heated areas will have the wrinkled surface.

Figures 2 and 3 demonstrate the method of my invention carried out in a continuous process. There, an endless support belt 16 of flexible material, for instance of paper or fabric, is concentrically arranged over an inner belt 17, said latter belt 17 being the element for selective heating; it therefore has cut-outs arranged in the form of the pattern desired in the final film. These two belts 16 and 17 are guided over rolls 18, 19, 20, 21, 22, 23, 24, 25, 26, 27, 27¹, and 28. The roll 28 is the driving roll which is driven by a motor 29 via a belt 30. The belt travels in the direction indicated by the arrow. A container 31 is arranged over the belt; it contains film forming material 32 which is dispensed from a dispense spout 33 onto the belt 16. A knife 34 then spreads it uniformly into a film 35 of the desired thickness. A number of infrared lamps 36 are arranged immediately adjacent said knife; there, the film is heated until the skin has developed in the desired areas. In view of the fact that the belt 16 travels with the same speed as the film 35, the pattern will be reproduced accurately in spite of the movement of the film. The heated film then enters a container 37 holding water 38 to which a wetting agent has preferably been added. There, the wrinkled texture is developed in the areas which have been previously covered with a skin. Thereafter the belts with the film enter a second container 39 in which the wetting agent is rinsed off by means of water 40. Next the film is prepared for peeling which is done by immersing it into a solution of trisodium phosphate 42 contained in a vessel 41. Finally the finished film 44 is detached from its support by a mechanical means (not shown), allowed to air-dry and then wound on a spool 43. Figure 4 gives an illustration of this film 44; it shows wrinkled areas 45 which form the background to a smooth pattern 46 which in the instance is of circular shape.

Figure 5 shows a film which has the same pattern, but reversed, and which has been obtained on the same apparatus and with the same method as that used for the film of Fig. 4. In this case, heating was continued until the skin on the background 48 was hardened so that water could not affect it any more and thus no wrinkles were formed. The pattern part, however, had a skin in the early stage of formation when water was applied, and thus in this case, the circular areas 49 obtained the wrinkled texture whereas the background remained smooth.

In Figure 6 another modification is illustrated according to which the belt for supporting the film and the belt for obtaining the selective heating are combined into one single element. There, a belt 52 is used, the body of which consists of material, for instance, of a high degree of heat conductivity. Holes 53 of the pattern desired have been cut into this belt 52; in this instance, however, the holes have been filled with a material 54 of a very low heat conductivity. It will be obvious that by filling the holes with a material of different heat conductivity, an element is obtained which also causes selective heating and which at the same time may be used as the support proper for the film. A dispense spout 55 is arranged over said combination belt 52, similar to that of Figure 2 from which thermoplastic material 56 is spread immediately onto said belt 52.

It will be understood that all kinds of materials may be combined in order to cause selective heating as long as there is obtained an element of different heat conductivity in various predetermined areas. As the support for the film previous to drying other materials than metal may be used. Thus, for instance wood, ceramics, plastic material, paper, fabric and others may be used; however, it has to be seen to that the temperature under the infrared light does not come close to the temperature at which the material of the base starts to decompose or to become effected.

All thermoplastic resins were found operative for the process and products of my invention. Thus, for example, vinyl acetate copolymers, vinyl chloride copolymers or a mixture of the two, chlorinated rubbers, styrene polymers and copolymers, cellulose acetate, cellulose acetate butyrate, cellulose acetate propionate, methyl cellulose, vinyl butyrate, polyethylene, butadiene copolymers such as butadiene acrylo nitrile and butadiene styrene copolymers, methyl methacrylate, vinylidene copolymer, vinyl acetate polymers, vinyl chloride-vinylidene chloride copolymer and mixtures of these substances are among those which were found satisfactory for the process of my invention.

As the solvents, those were preferred which have a high evaporation rate. For instance, methyl ethyl ketone, acetone, butyl acetate, cyclohexanone, xylol, toluol, toluol together with nitroparaffins, and amyl acetate were found highly satisfactory. The concentration of the resin solution depends upon the viscosity desired. Generally, a concentration of from 5 to 65 parts by weight of resin per 100 parts by weight of solution was the range found satisfactory. The viscosity preferred was approximately 36.2 centipoises at 25° C. However, this viscosity is by no means obligatory, especially not since the way of applying the coating composition also necessitates an adjustment of the concentration of the solution as will be set forth in a later paragraph.

While a resin solution consisting merely of resin and solvent is fully satisfactory, it is often advantageous and therefore desirable to add a plasticizer. All plasticizers known in the art are suitable for this purpose. Tricresyl phosphate, dioctyl phthalate and dibutyl phthalate are examples for suitable plasticizers.

Other auxiliary ingredients may be added to the resin solution without deviating from the concept of the invention. Thus filler materials, pigments and dyes may be incorporated into the coating solution.

The coating composition may be applied by any means known in the art. Knifing, rolling and spraying have been used with satisfaction. It will be obvious that for spraying, the use of a less viscous solution is advisable than is preferred for knifing or rolling.

Likewise, any wetting agents known in the art may be used; excellent results have been obtained with the addition of 10% of sodium sulfate of 3,9-diethyltridecanol-6 to the water.

The films obtained by the process of my invention have a very pleasing appearance which can still be increased by the addition of dyes or pigments to the plastic material. The process of producing the films of this invention is extremely simple in view of the fact that although wrinkled and non-wrinkled textures are produced at the same time, only one composition and one step of application have to be used therefor. Once a "stencil" for differential heating has been made for one pattern, it can be used over and over again.

It will be understood that while there have been described herein certain specific embodiments of the invention, it is not intended thereby to have it limited to or circumscribed by the specific details given in view of the fact that this invention is susceptible to various modifications and changes which come within the spirit of this disclosure and the scope of the appended claims.

I claim:

1. In a method of producing a plastic film with wrinkle-textured and smooth areas arranged in groups in a predetermined pattern, the steps of selectively heating a coating of a solution of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers and mixtures of these substances, with regard to said two groups of areas to a stage when one group only of said areas is covered with a soft skin which wrinkles in contact with water, and of applying water to said areas.

2. In a method of producing a plastic film with wrinkle-textured and smooth areas arranged in groups in a predetermined pattern, the steps of selectively heating a coating of a solution in a non-aqueous solvent of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers, and mixtures of these substances, at different speeds in different groups of areas so that one group only of said areas is covered with a soft skin which wrinkles in contact with water, and applying water to said areas.

3. In a method of producing a plastic film with wrinkle-textured and smooth areas arranged in groups in a predetermined pattern, the steps of selectively heating a coating of a solution of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers, and mixtures of these substances, with regard to said two groups of areas to a stage when one group of said areas has a skin on said coating whereas said other group is free from such skin, and applying water to said coating.

4. In a method of producing a plastic film with wrinkle-textured and smooth areas arranged in groups in a predetermined pattern, the steps of selectively heating a coating of a solution of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers, and mixtures of these substances, with regard to said two groups of areas to a stage when one group of said areas has a skin in its initial stage of formation, whereas said other group of areas is covered with a skin already hardened, and applying water to said coating.

5. In a method of producing a plastic film with wrinkle-textured and smooth areas arranged in groups in a predetermined pattern, the steps of selectively heating a coating of a solution of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers, and mixtures of these substances with regard to said two groups of areas to a stage when one of said groups of areas has a skin on said coating, whereas said other group is free from such skin, and applying water containing a wetting agent to said coating.

6. In a method of producing a plastic film with wrinkle-textured and smooth areas arranged in groups in a predetermined pattern, the steps of selectively heating a coating of a solution of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinylchloride-vinylidene chloride copolymers and mixtures of these substances, with regard to said two groups of areas to a stage when one of said groups of areas has a skin in its initial stage of formation, whereas said other group of areas is covered with a skin already hardened, and applying water containing a wetting agent to said coating.

7. In a method of producing a plastic film with wrinkle-textured and smooth areas arranged in groups in a predetermined pattern, the steps of applying a coating of a solution of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers and mixtures of these substances, to a support surface having selected portions thereof of different heat conductivity from the other portions of said support surface, said portions being arranged in groups corresponding to the predetermined pattern, exposing said support with said resin thereon to heat until one group of said areas as determined by the differential heating has a skin in the initial stage of formation, immediately immersing said support and solution into water, removing solvent and water from said coating, and peeling the film thus produced from said support.

8. In a method of producing a plastic film with wrinkle-textured and smooth areas arranged in groups in a predetermined pattern, the steps of applying a coating of a solution of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers, and mixtures of these substances, to a support surface having selected portions thereof of different heat conductivity from the other portions of said support surface, said portions being arranged in groups corresponding to the predetermined pattern, exposing said support with said resin thereon to infrared heat until one group of said areas as determined by the differential heating has a skin in the initial stage of formation; immediately immersing said solution and support into water containing a wetting agent; rinsing said coating in order to remove said wetting agent; removing said solvent and water from said coating; and peeling the film thus produced from said support.

9. In a method of producing a plastic film with wrinkle-textured and smooth areas arranged in groups in a predetermined pattern, the steps of applying a coating of a solution of a resin selected from the group consisting of vinyl acetate copolymers, vinyl chloride copolymers, chlorinated rubbers, styrene polymers and copolymers, cellulose acetate, cellulose acetate butyrate, cellulose acetate propionate, methyl cellulose, vinyl butyrate, polyethylene, butadiene copolymers, methyl methacrylate, vinyl acetate polymers, vinyl chloride-vinylidene chloride copolymers, and mixtures of these substances, to a support surface having selected portions thereof of different heat conductivity from the other portions of said support surface, said portions being arranged in groups corresponding to the predetermined pattern, exposing said support with said resin thereon to infrared heat until one group of said areas as determined by the differential heating has a skin in the initial stage of formation; immediately immersing said solution and support into water containing a wetting agent; rinsing said coating in order to remove said wetting agent; removing solvent and water from said coating; immersing said coated support into a solution of trisodium phosphate; peeling the film thus produced off said support; and allowing said film to air dry.

10. In a method of producing a plastic film with wrinkle-textured and smooth areas arranged in a predetermined pattern, the steps of (a) applying to a support capable of causing differential heating a coating consisting of 150 grams of a copolymer formed of 87% by weight of vinyl chloride and 13% by weight of vinyl acetate, 100 grams of butyl acetate, 100 grams of methyl ethyl ketone, 125 grams of cyclohexanone and 25 grams of diethylhexyl phthalate; (b) subjecting said coating to infrared heat of approximately 140° F. for 1½ minutes; (c) immersing said coating on said support into a mixture of 90% water and 10% sodium sulfate of 3,9-diethyltridecanol-6 as a wetting agent for approximately 3 minutes; (d) rinsing said coating with water until said wetting agent has been completely removed; (e) heating said coating for about ½ hour to 120° F. and thereafter to approximately 220° F. until complete removal of said solvents; and (f) peeling the film thus produced from said support.

11. In a method of producing a plastic film with wrinkle-textured and smooth areas arranged in a predetermined pattern, the steps of (a) applying to a support capable of causing differential heating a coating consisting of 150 grams of a copolymer formed of 87% by weight of vinyl chloride and 13% by weight of vinyl acetate, 100 grams of butyl acetate, 100 grams of methyl ethyl ketone, 125 grams of cyclohexanone and 25 grams of diethylhexyl phthalate; (b) subjecting said coating to infrared heat of approximately 140° F. for 4 minutes; (c) immersing said coating on said support into a mixture of 90% water and 10% sodium sulfate of 3,9-diethyltridecanol-6 for approximately 3 minutes; (d) rinsing said coating with water until said wetting agent has been completely removed; (e) heating said coating for about ½ hour to 120° F. and thereafter to approximately 220° F. until complete removal of said solvents; and (f) peeling the film thus produced from said support.

WILLIAM F. FLANAGAN.

REFERENCES CITED

The following references are of record in the file of this patent:

UNITED STATES PATENTS

| Number | Name | Date |
| --- | --- | --- |
| 1,831,323 | Root | Nov. 10, 1931 |
| 2,234,842 | Jordan | Mar. 11, 1941 |
| 2,268,678 | Tingey | Jan. 6, 1942 |
| 2,308,024 | Piker | Jan. 12, 1943 |
| 2,320,431 | Hawtin et al. | June 1, 1943 |
| 2,339,775 | Ether | Jan. 25, 1944 |
| 2,353,717 | Francis | July 18, 1944 |
| 2,360,650 | Crane | Oct. 17, 1944 |
| 2,376,655 | Brotz | May 22, 1945 |